W. F. WRIGHT.
RIM BREAKER.
APPLICATION FILED APR. 9, 1918.
1,315,068.
Patented Sept. 2, 1919.
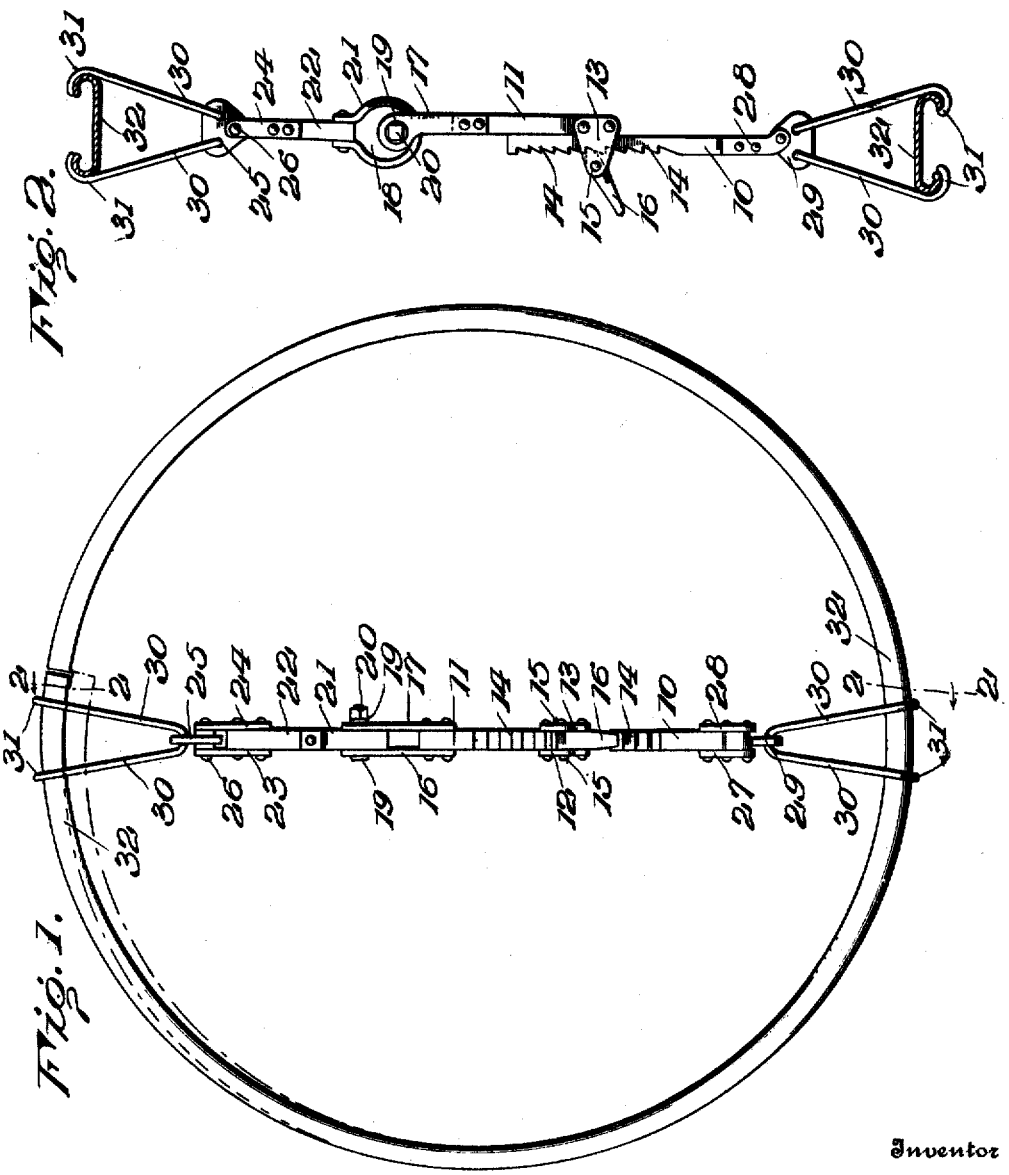
Inventor
W. F. Wright.

UNITED STATES PATENT OFFICE.

WALTER FOISTER WRIGHT, OF PUEBLO, COLORADO.

RIM-BREAKER.

1,315,068. Specification of Letters Patent. Patented Sept. 2, 1919.

Application filed April 9, 1918. Serial No. 227,612.

*To all whom it may concern:*

Be it known that I, WALTER FOISTER WRIGHT, a citizen of the United States, residing at Pueblo, in the county of Pueblo and State of Colorado, have invented certain new and useful Improvements in Rim-Breakers, of which the following is a specification.

This invention relates to implements for detaching the rims from pneumatic tires and known as "rim breakers", and has for one of its objects to improve the construction and increase the efficiency and utility of devices of this character.

The invention consists in certain novel features of construction, as hereinafter shown and described and then specifically pointed out in the claim; and in the drawings illustrative of the preferred embodiment of the invention—

Figure 1 is a front elevation of the improved implement applied to a conventional pneumatic tire rim.

Fig. 2 is a side elevation of the improved implement with the rim in section on the line 2—2 of Fig. 1.

The improved device comprises coacting body members 10—11 slidably engaged with one of the members, for instance, the member 11, provided with cheek plates 12—13, and the other member provided with a plurality of ratchet teeth 14. Pivoted at 15 between the cheek plates is a holding pawl 16 with its inner end engaged in the ratchet teeth. By this means the members 10—11 may be adjusted longitudinally and held in adjusted position by the coaction of the pawl and the ratchet teeth. Connected to the member 11 are other cheek plates 16—17 in which an eccentric 18 is mounted to swing upon a shaft 19, the shaft being extended and squared as shown at 20 to receive a turning crank or wrench. Encompassing the eccentric 18 is a strap 21 rigidly connected to a stock member 22. By this arrangement when the eccentric is rotated by a wrench or other implement applied to the terminal 20, the eccentric will engage the stock 22 and correspondingly operate the latter.

Connected to the stock member 22 are other cheek plates 23—24 between whose outer ends a holding member 25 is pivotally connected at 26.

Rigidly connected to the free end of the stock member 10 are other cheek plates 27—28, and arranged to swing between the plates 27—28 is a holding member 29 similar to the holding member 25.

Mounted to swing in the holding members 25—29 are rim engaging rods, and as said rods are precisely alike a description of one will suffice for all. Each pair of rim engaging members is formed from a single rod bent intermediate the ends to engage through apertures in the members 25—29 whereby body portions 30 are formed with each portion 30 terminating in a hook 31 to engage over the flanges of the rim, the rim being represented as a whole at 32.

Two sets of the rim engaging members will preferably be associated with each of the holding members 25—29. Thus the improved device includes eight of the hooks 31 and eight of the portions 30.

To operate the improved device the members 10—11 are adjusted until the hooks 31 of the rim engaging members at one end engage the flange portions of the rim 32 adjacent the split portion thereof, and the hooks 31 at the opposite end of the implement engage over the flanges of the rim substantially at a diametrically opposite point. The members 10—11 will be adjusted through the coaction of the pawl 16 and the ratchet teeth 14 until the hooks apply a relatively strong force upon the rim when the eccentric 18 is in its open position as shown in Fig. 2. Then when the eccentric is operated by a wrench or other implement applied to the squared terminal 20, a pulling force will be applied to draw the engaged terminal of the rim into the position shown by dotted lines in Figs. 1 and 2, thus "breaking" and releasing it from the tire. When a rim is to be applied to a tire, the rim is compressed into the position shown by dotted lines in Fig. 1 before it is applied to the tire, this operation disposing the rim into position to be readily inserted in the tire. Then when the implement is released by reversing the movement of the eccentric, the rim will spring by its own resiliency into the position shown in full lines in Fig. 1. Then by releasing the pawl 16 the implement can be readily detached. The rim engaging members 30 can be disposed substantially in parallel relation to the body portion of the implement when not in use, and the members 10—11 disposed side by side, to enable the implement to be folded into a small space for transportation or storage. The implement may thus be carried in the tool box of an automobile or like vehicle.

Having thus described the invention, what is claimed as new is:

A rim breaker comprising coacting extension bars one of which is provided with ratchet teeth and the other formed of inner and outer sections, a keeper carried by the inner section and spanning the toothed bar, a pawl pivotally mounted on the keeper and engaging the teeth for holding the extension bars in adjusted position, a shaft journaled on one of the sections, an eccentric mounted on the shaft, a strap carried by the other section and engaging the eccentric, the said eccentric in conjunction with the strap forming a pivotal connection between the adjacent ends of the inner and outer sections, and rim-engaging members carried by the outer ends of the extension bars, said shaft being provided with means for engagement with an operating tool for rotating the eccentric to place the rim-engaging members under tension after said bars have been adjusted.

In testimony whereof I affix my signature.

WALTER FOISTER WRIGHT.

Copies of this patent may be obtained for five cents each, by addressing the "Commissioner of Patents, Washington, D. C."